US008144694B2

(12) United States Patent
Knasnabish et al.

(10) Patent No.: US 8,144,694 B2
(45) Date of Patent: Mar. 27, 2012

(54) SYSTEM AND METHOD FOR PROVIDING EQUAL ACCESS OVER PACKET-SWITCHED NETWORKS

(75) Inventors: Bhumip Knasnabish, Lexington, MA (US); Takkin G. Yum, Briarcliff Manor, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 276 days.

(21) Appl. No.: 12/137,008

(22) Filed: Jun. 11, 2008

(65) Prior Publication Data

US 2009/0310605 A1 Dec. 17, 2009

(51) Int. Cl.
*H04L 12/66* (2006.01)

(52) U.S. Cl. .................... 370/352; 379/221.02; 370/235

(58) Field of Classification Search ........................ None
See application file for complete search history.

(56) References Cited

U.S. PATENT DOCUMENTS

| | | | | |
|---|---|---|---|---|
| 5,473,679 | A * | 12/1995 | La Porta et al. | 379/201.05 |
| 5,835,583 | A * | 11/1998 | Hetz et al. | 379/221.02 |
| 2001/0028660 | A1* | 10/2001 | Carolan et al. | 370/466 |
| 2002/0101858 | A1* | 8/2002 | Stuart et al. | 370/352 |
| 2005/0157640 | A1* | 7/2005 | Anschutz et al. | 370/216 |

* cited by examiner

*Primary Examiner* — Jason Mattis
*Assistant Examiner* — James P Duffy

(57) ABSTRACT

A system and method for equal access over a wireline and/or wireless packet-switched network including a receiver to receive, from a requestor, a request for equal access to a service provider, and a processor to present one or more equal access criteria to be satisfied by the requestor, and in the event the one or more equal access criteria are satisfied by the requestor, to allow, to the requestor, equal access over a wire-line and/or wireless packet-switched network to the service provider.

18 Claims, 5 Drawing Sheets

SYSTEM AND METHOD FOR PROVIDING EQUAL ACCESS OVER PACKET-SWITCHED NETWORKS

BACKGROUND INFORMATION

Voice, data, and multimedia services are becoming increasingly popular with consumers. Equal access (EA) allows subscribers to select services from a variety of service providers. For example, equal access (EA) may require a voice service provider to allow its subscribers to select long distance telephone service from another voice service provider of choice. In time-division multiplexed (TDM) based voice service, which uses a circuit-switched network, equal access is generally implemented and managed when one or more circuits of the circuit-switched network are allocated for accessing and call (session) routing using a set of pre-specified criteria. However, in internet protocol (W) networks, in which a data-oriented protocol is used for communicating data across a packet-switched network, it may be difficult to allocate these resources in a service-specific fashion because these resources are shared with voice. These may include access, transport, memory, processing, and/or other similar resources. Furthermore, equal access IP networks typically run across a variety of different devices (e.g., usually at different network locations) using multiple mechanisms, which create interoperability and other issues that cannot be resolved easily. Thus, as packet-switched networks continue to be used by consumers for various services, such as voice, data, and multimedia, current systems lack a technique to comprehensively and effectively provide equal access in packet-switched networks across multiple devices.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Figure 1:
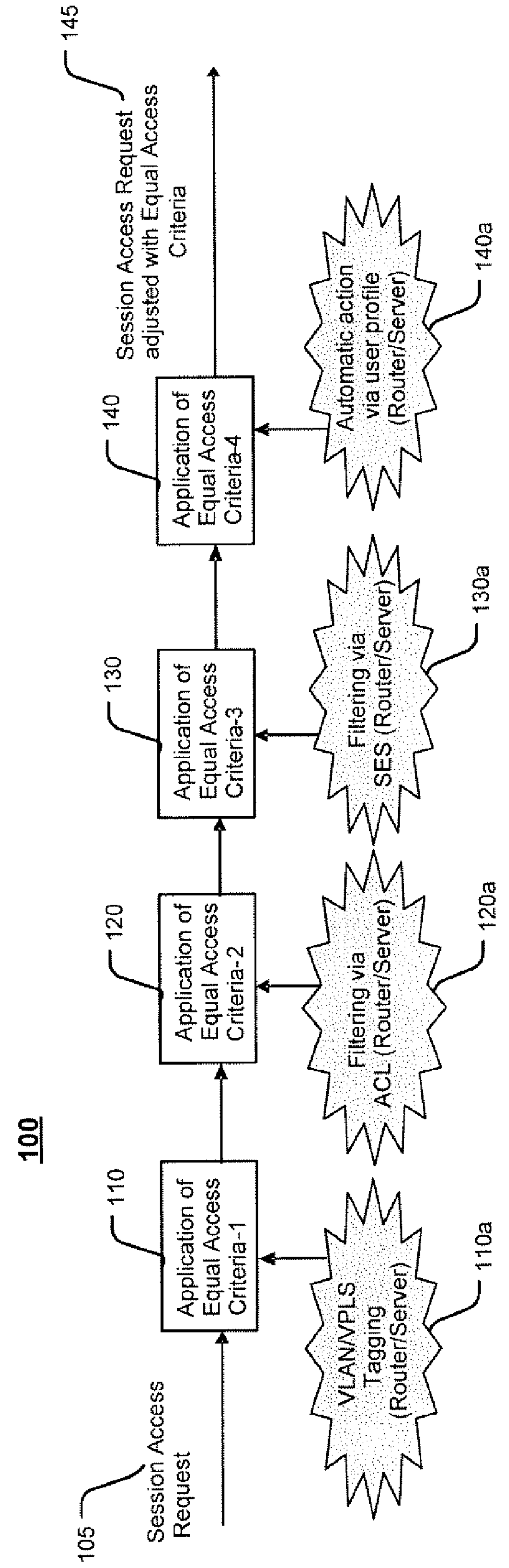
FIG. 1 depicts a flowchart of a method for providing equal access, according to an exemplary embodiment.

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for providing equal access (EA) for voice, data, and/or multimedia services over Internet Protocol (IP) networks. That is, exemplary embodiments may, among other things, expand and optimize IP networks to effectively provide equal access (EA) across multiple devices.

It should be appreciated that exemplary embodiments for providing EA allow implementation of equal distribution/allocation of access resources among the incoming sessions/services over IP networks based on pre-specified criteria, type of service (e.g., at least one of voice, messaging, video, multimedia, etc.), or other equal access qualification. This may enable implementation of equal access for voice service (over IP networks) and other multimedia services allowing users (or subscribers) to choose a provider using a variety of criteria, such network identifier, provider identifier, etc., and allowing both users and service providers the desired (and sometimes required) flexibility.

In general, equal access may be provided when a set of criteria are met. When these criteria are met, one or more signals may be routed to provide such access to a particular service provider. For example, a long distance calling card of a particular service provider may be a typical approach for providing equal access implementation. In order to use the calling card of that particular service provider, there may be a set of instructions on the back of the card to show a user to how to get access to that service provider's network. For example, the instructions may ask the user to enter an initial number, then enter a specific code or key associated with that calling card, then enter a particular network number, then enter a country code, and finally enter the telephone number of party with whom the user wants to call. Once all these "criteria" (e.g., equal access qualifications) have been met, the service provider may provide access to the user to the service provider's network and dial the called party.

In time-division multiplexed (TDM) based voice service, which uses a circuit-switched network, equal access is generally implemented and managed when one or more circuits of the circuit-switched network are allocated for accessing and call (session) routing using a set of pre-specified criteria.

However, in packet-switched networks (e.g., Internet Protocol (IP) networks, Multi Protocol Label Switching (MPLS) networks, etc.), in which a data-oriented protocol is used for communicating data across a packet-switched network, it may be difficult to allocate these resources in a service-specific fashion because these resources are shared with voice. Nevertheless, an EA system may apply one or more EA criteria at one or more routers, servers. switches, or intelligent devices or gateways. This may be achieved through one or more virtual local area network (VLAN)/virtual private LAN service (VPLS) tagging, filtering via access control list (ACL), filtering via security enforcement scheme (SES), automatic action via user profile, and/or other similar filtering schemes.

For example, FIG. 1 depicts a flowchart of a method for providing equal access 100, according to an exemplary embodiment. When a session access request is received 105 at a receiver, one or more processors may apply a first equal access criteria, as depicted in block 110. Specifically, the first equal access criteria may be provided by VLAN/VPLS tagging **110*a*. At block 120, the one or more processors may apply a second equal access criteria, which may be provided by filtering via access control list (ACL) 120*a*. At block 130, the one or more processors may apply a third equal access criteria, which may be provided by filtering via security enforcement scheme (SES) 130*a*. At block 140, the one or more processors may apply a fourth equal access criteria, which may be provided by automatic action via user profile 140*a*. After each of the four EA criteria have been satisfied, a session may be established, where the session may be adjusted by the equal access criteria 145**.

It should be appreciated that a session access request may be adjusted with equal access criteria as well. It should further be appreciated that while only four criteria are described, greater or lesser EA criteria may be applied. These may include the same filtering schemes or other similar filtering schemes. In addition, it should be appreciated that while each of application of EA criteria is described as being associated to a particular type of filtering, other filtering criteria and/or combinations may also be provided.

Since these criteria may be added as parts of access control and/or security enforcement, it should be appreciated that no additional hardware devices may be required for implementing and managing equal access over packet-switched networks (e.g., IP networks, MPLS networks, etc.). Additionally, minimal software and processing overheads may be involved which facilitate these exemplary embodiments for field deployment.

Exemplary embodiments may call for extending the existing access control list (ACL) and security enforcement scheme (SES) so that an additional set of criteria may be invoked when it is required to do so These ACL and SES may be implemented via software configuration updates and/or software upgrades in the existing routers and security infrastructure. These routers and/or security servers may reside in the access network or may be centralized (e.g., at a core network). Centralization may be advantageous in the event there are scalability and/or regulatory requirements.

In addition to virtual LAN (VLAN) based identification and session access control, other logical entities may also be used to implement equal access. For example, these may include IP address, MAC address, and/or other device identification of endpoints as well. In one embodiment, these additional access control criteria may be incorporated in customer premises LANs, access networks, and/or core networks. For example, exemplary embodiments may include (a) endpoint (or customer premises equipment (CPE)) hosted schemes, (b) access network (AN) hosted schemes, and (c) core network (CN) hosted schemes.

As shown below, TABLE 1 depicts equal access implementation where access control criteria may be included at (a) endpoint (or customer premises equipment (CPE)) hosted mechanisms, (b) access network (AN) hosted schemes, (c) core network (CN) hosted mechanisms, and (d) third party servers (TPS).

endpoint (CPE-EP) device 202 that is coupled to a customer premises equipment (CPE) network 204. The CPE network 204 may be coupled to an access network (AN) 206, which in turn may be coupled to a core network (CN) 208. The CN may be coupled to one or more service provider platforms 210*a*-210*n*. Equal access service traffic 222 may pass from the CPE network 204 through the AN 206 and CN 208 via IP association 204 to the one or more service provider platforms 210*a*-210*n*.

Figure 2:
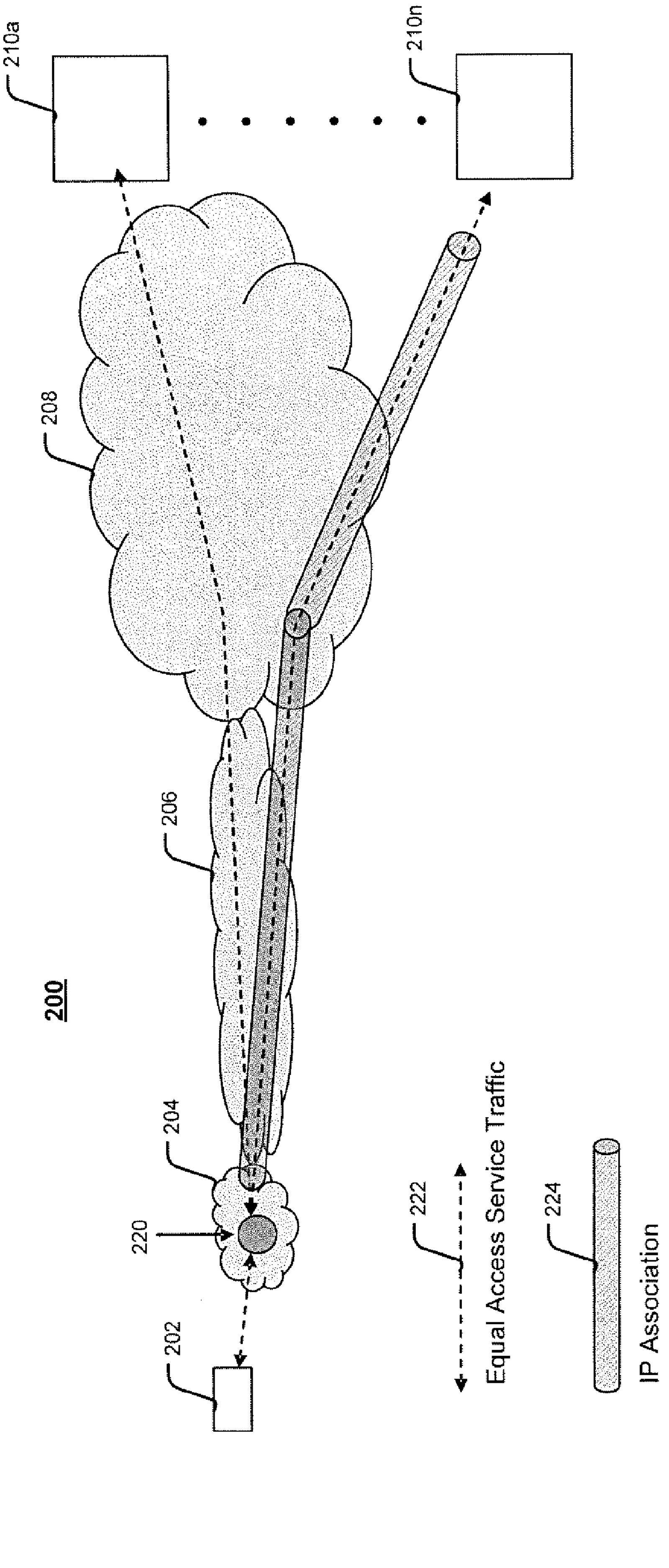
FIG. 2 depicts a schematic block diagram for equal access implementation at customer premises equipment (CPE), according to another exemplary embodiment.

Customer premises equipment (CPE) hosted mechanisms may vary based on manufacturers' settings and desired network capabilities which may not be always valid/applicable. These may generally create both implementation and interoperability issues. However, when a EA system 220 is situated at the CPE network 204, as depicted in FIG. 2, a subscriber, at the CPE-EP device 202, may be coupled to an open network and all service providers may be accessed via the open network. In one embodiment, the EA system 220 at the CPE network 204 may maintain a profile for the user's equal access service preference. In another embodiment, the CPE EA system 220 may also maintain a local default service provider address and/or a list of local service provider addresses. If the CPE EA system 220 receives service requests at the default address, it may forward the service request according to the user's service preference. If the CPE EA system 220 receives the service request from one of the local service provider addresses, it may forward the request to the associated service provider. Other various embodiments may also be provided.

Figure 3:
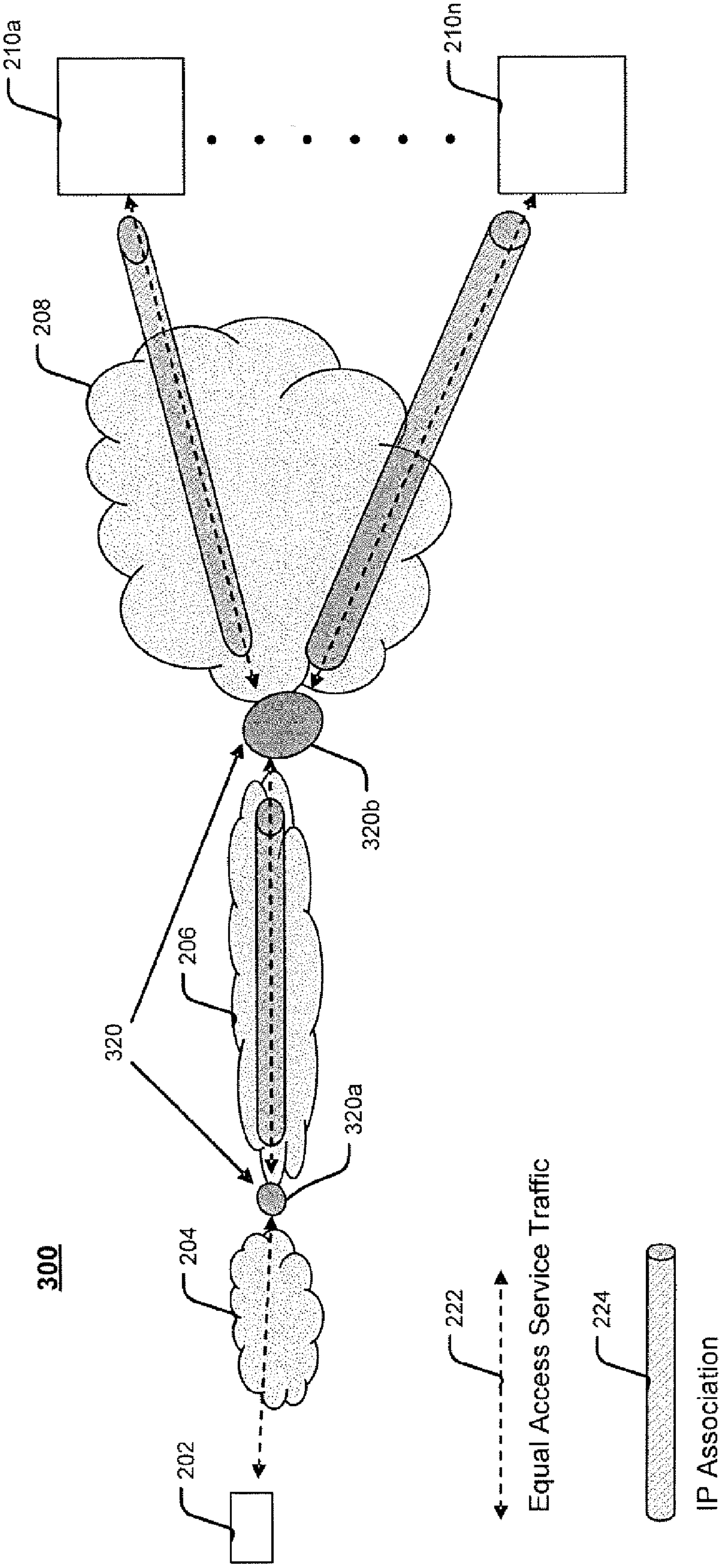
FIG. 3 depicts a schematic block diagram for equal access implementation at an access network (AN), according to another exemplary embodiment.

FIG. 3 depicts a schematic block diagram of a system 300 for equal access implementation at an access network (AN), according to another exemplary embodiment. Like FIG. 2, the system 300 may include a customer premises equipment endpoint (CPE-EP) device 202, a customer premises equipment (CPE) network 204, an access network (AN) 206, a core network (CN) 208, and one or more service provider platforms 210*a*-210*n*, where equal access service traffic 222 may pass from the CPE network 204 through the AN 206 and CN 208 via IP association 224 to the one or more service provider platforms 210*a*-210*n*.

However, unlike FIG. 2, FIG. 3 may implement an EA system 320 at the access network (AN) 206. For example, in one embodiment, the system 300 may include a first AN EA system 320*a* at the customer end of the AN 206 and a second

TABLE 1

EQUAL ACCESS (EA) ASSOCIATION OPTIONS

| | CPE EP to EA System Association | EA System Endpoints Association | EA System to Service Provider Association |
|---|---|---|---|
| CPE based EA System | IP-IP peering<br>EA access criteria | N/A | IP-IP peering<br>Layer 2 tunneling |
| Access Network based EA System | IP-IP peering<br>EA access criteria | IP-IP peering<br>Layer 2 tunneling | IP-IP peering<br>Layer 2 tunneling<br>Layer 3 VPN |
| Core Network based EA System | IP-IP peering<br>EA access criteria | N/A | IP-IP peering<br>Layer 2 tunneling<br>Layer 3 VPN |
| Third-Party Server based EA System* | IP-IP peering<br>EA access criteria | N/A | IP-IP peering<br>Layer 2 tunneling<br>Layer 3 VPN |

*May require registration to the server for EA

FIG. 2 depicts a schematic block diagram of a system 200 for equal access implementation at customer premises equipment (CPE), according to another exemplary embodiment. The system 200 may include a customer premises equipment AN EA system 320*b* at the network end of the AN 206. It should be appreciated that the first AN EA system 320*a* and the second AN EA system 320*b* may maintain a virtual transport association over the AN 206.

Equal access service traffic 222 may pass from the CPE network 204 to the AN EA system 320 at the AN 206 provide equal access service traffic 222 through the CN 208 via IP association 224 to the one or more service provider platforms 210*a*-210*n*. In particular, the EA system 320*a* at the customer end may accept a user's service requests and may tunnel these requests over the access network to the EA system 320*b* at the network end. If the EA system 320*b* receives service requests at the default address, the EA system 320*b* may forward the service request according to the user's preferred service provider. If the EA system 320*b* receives the service request from one of the local service provider addresses, the EA system 320*b* will forward the request to the associated service provider.

It should be appreciated that the EA system 320 may maintain a profile for each user's equal access service preference. In another embodiment, the EA system 320 may also maintain a local default service provider address and a list of local service provider addresses. Other various embodiments may also be provided.

Figure 4:
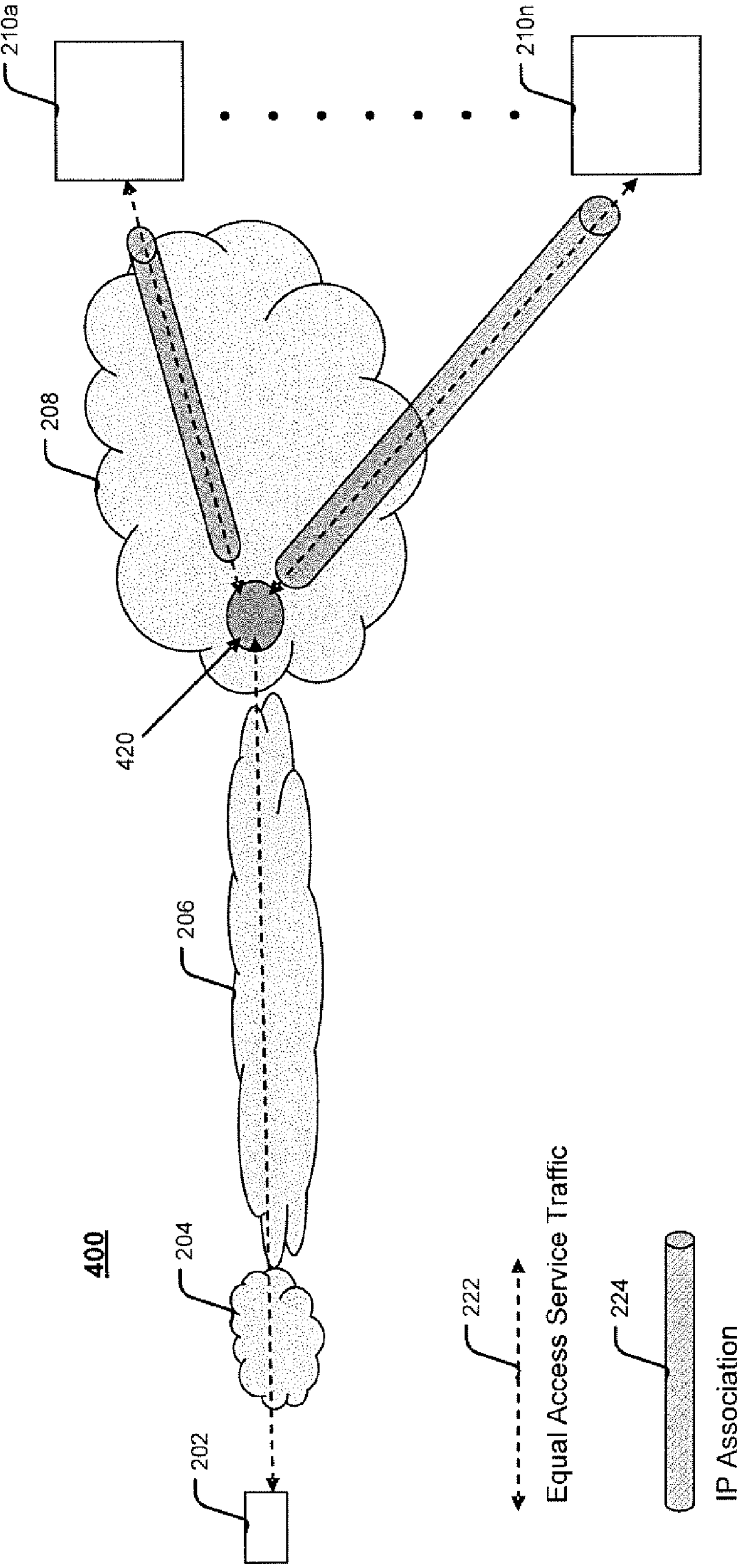
FIG. 4 depicts a schematic block diagram for equal access implementation at a core network (CN), according to another exemplary embodiment.

FIG. 4 depicts a schematic block diagram of a system 400 for equal access implementation at a core network (CN), according to another exemplary embodiment. Like FIG. 2, the system 400 may include a customer premises equipment endpoint (CPE-EP) device 302, a customer premises equipment (CPE) network 304, an access network (AN) 306, a core network (CN) 308, and one or more service provider platforms 210*a*-210*n*, where equal access service traffic 222 may pass from the CPE network 204 through the AN 206 and CN 208 via IP association 224 to the one or more service provider platforms 210*a*-210*n*.

However, unlike FIG. 2, FIG. 4 may implement an EA system at the core network (CN) 208. For example, in one embodiment, the system 400 may include a CN EA system 420 at the CN 208.

The CN EA system 420 may accept a user's service requests anywhere from the network. In one embodiment, for example, if the CN EA system 420 receives the service requests at the global default service provider address, the CN EA system 420 may forward the requests to the one or more service provider 210*a*-210*n* according to the user's profile. In another embodiment, if the CN EA system 420 receives the service request from one of the global service provider addresses, the CN EA system 420 may forward the request to the associated service provider.

It should be appreciated that the CN EA system 420 may maintain a profile for each user's equal access service preference. In another embodiment, the CN EA system 420 may also maintain a global default service provider address and/or a list of global service provider addresses.

Figure 5:
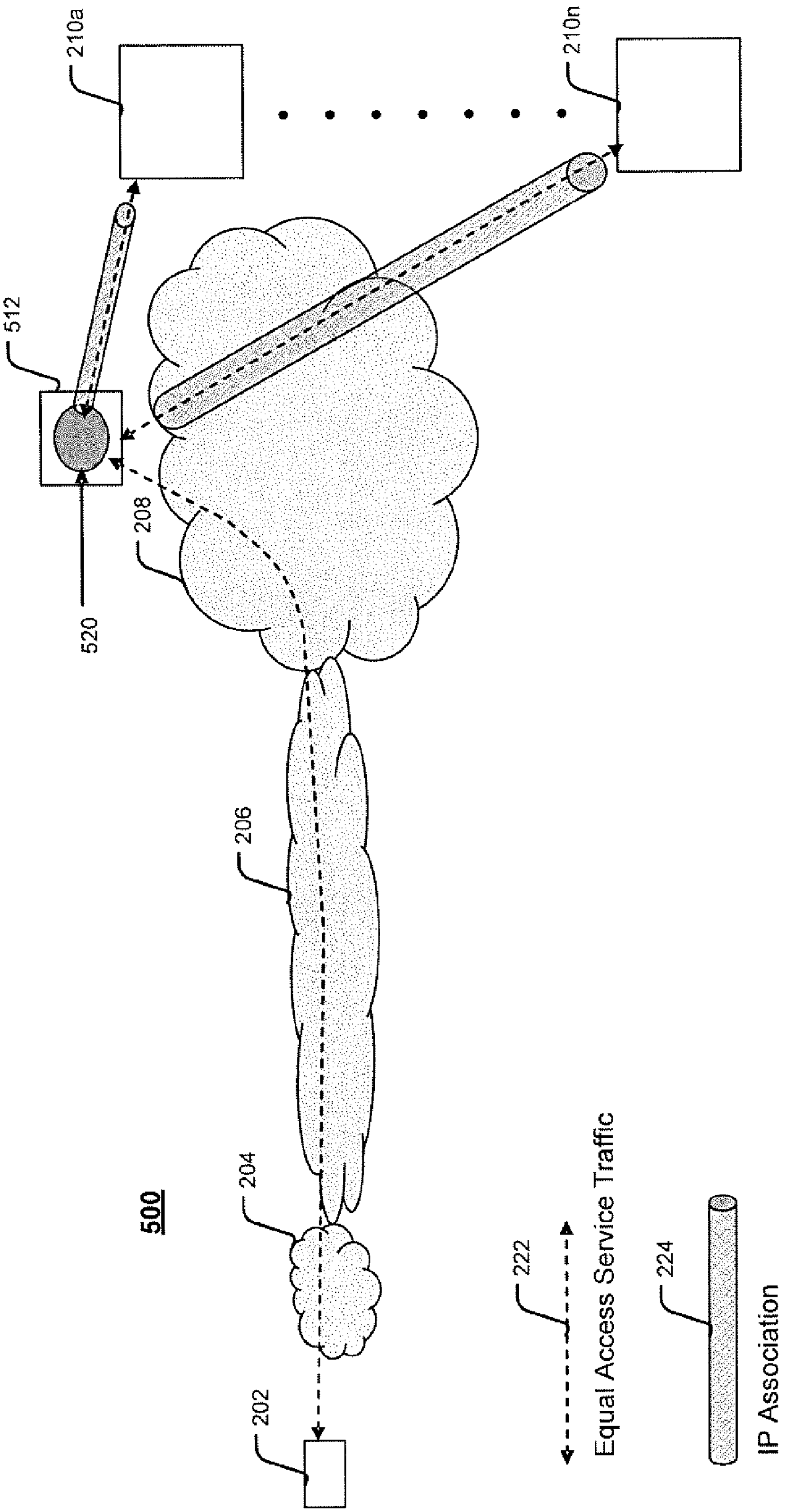
FIG. 5 depicts a schematic block diagram for equal access implementation at a third party server (TPS), according to another exemplary embodiment.

FIG. 5 depicts a schematic block diagram of a system 500 for equal access implementation at a third party server (TPS) 512, according to another exemplary embodiment. Like FIG. 2, the system 500 may include a customer premises equipment endpoint (CPE-EP) device 202, a customer premises equipment (CPE) network 204, an access network (AN) 206, a core network (CN) 208, and one or more service provider platforms 210*a*-210*n*, where equal access service traffic 222 may pass from the CPE network 204 through the AN 206 and CN 208 via IP association 224 to the one or more service provider platforms 210*a*-210*n*.

However, unlike FIG. 2, FIG. 5 may implement an EA system 520 at the TPS 512. For example, in one embodiment, the system 500 may include a TPS EA system 520 at the TPS 512 to a virtual transport association over the AN 206.

In this example, a user may register one or more clients (e.g., software or hardware) for equal access services for a voice, data, and/or multimedia sessions. It should be appreciated that a user's device may host multiple software clients for simultaneously or near-simultaneously running a mixture of equal-access and non-equal-access session for multimedia services. Other various embodiments may also be provided.

It should be appreciated that equal access may be provided in several application and/or functional scenarios. These may include (1) a Default Service Provider Selection Function, (2) a Dynamic Service Provider Selection Function, and/or (3) a Multiple Service Provider Selection Function.

In a Default Service Provider Selection Function, a user may be allowed to use a default service provider. For example, once a service provider is selected, the EA system may provide registration, service interaction, and/or deregistration functions associated with the default service provider.

In a Dynamic Service Provider Selection Function, a user may be allowed to use a one-time or non-fixed service provider as his/her service provider. Furthermore, the EA system may support conditions under which the user's service requests may be delivered to the service provider. These may be time based or logic based conditions. Other various conditions may also be considered.

In a Multiple Service Provider Selection Function, a user may be allowed to use a list of service providers with one default service provider and multiple dynamic service providers. Furthermore, the EA system may allow the user to manually select a service provider and rely on a pre-defined profile to select a service provider. In a manual mode, for example, the user may select a desired service provider explicitly and the EA system may subsequently deliver the service request to the selected service provider. In a profile mode, for example, the user may define a set of time or event based conditions (e.g., service quality) through which a specific service provider will be selected.

It should be appreciated that the EA system may also be able to perform one or more registration, service interaction, and deregistration functions associated with all service providers. The EA system may also support one or more security functions to protect against unauthorized changes to the user's selection. Other various embodiments may also be provided.

While depicted as networks, network components, servers, platforms, and/or devices, it should be appreciated that embodiments may be constructed in software and/or hardware, as separate and/or stand-alone, or as part of an integrated transmission and/or switching device/networks.

It should be appreciated that although embodiments are described primarily with complying with equal access requirements, the systems and methods discussed above are provided as merely exemplary and may have other applications. These may include comprehensive network maintenance, data delivery, marketing and advertisement-directed services, etc.

Additionally, it should also be appreciated that system support and updating of the various components of the system may be easily achieved. For example, an administrator may have access to one or more of these networks or system components. Furthermore, it should also be appreciated that the one or more networks, system components, servers, platforms, and/or devices of the system may not be limited to physical components. These components may be software-based, virtual, etc. Moreover, the various components, servers, and/or devices may be customized to perform one or more additional features and functionalities. Such features and functionalities may be provided via deployment, transmitting and/or installing software/hardware. Also, although depicted as singular networks or system components, each of the various networks or system components may be equal, greater, or lesser.

It should also be appreciated that each of the networks or system components may include one or more processors, servers, and/or devices (not shown) for optimizing equal access delivery. It should be appreciated that one or more data storage systems (e.g., databases) (not shown) may also be coupled to each of the one or more processors, servers, and/or devices of the system to store relevant information for each of the servers and system components. Other various embodiments may also be provided. The contents of any of these one or more data storage systems may be combined into fewer or greater numbers of data storage systems and may be stored on one or more data storage systems and/or servers. Furthermore, the data storage systems may be local, remote, or a combination thereof to clients systems, servers, and/or other system components. In another embodiment, information stored in the databases may be useful in providing additional customizations for optimizing equal access implementation.

It should be appreciated that while equal access is described as being implemented at the CPE 204, AN 206, CN 208, or TPS 512, the EA system may be implemented at one, all, or a combination of at least the CPE 204, AN 206, CN 208, and TPS 512. It should also be appreciated that other various networks or system components (e.g., routers, servers, switches, or any intelligent gateway device) may implement an EA system as well.

It should be appreciated that equal access is described as being implemented over wireline networks and systems, other various embodiments may also be provided. For example, equal access may be implemented over wireless networks or systems. Whether wireline or wireless, the network and/or system may be a local area network (LAN), wide area network (WAN), or any other network configuration. Additionally, various communication interfaces may be used. These may include an integrated services digital network (ISDN) card or a modem to provide a data communication connection. In another embodiment, the communication interface may be a local area network (LAN) card to provide a data communication connection to a compatible LAN. Wireless links (e.g., microwave, radio, etc.) may also be implemented. In any such implementation, the communication interface may send and receive electrical, electromagnetic, and/or optical signals that carry digital data streams representing various types of information.

In one embodiment, wireline network/system may include long-range optical data communications, local area network based protocols, wide area networks, and/or other similar applications. In another embodiment, wireless broadband connection may include long-range wireless radio, local area wireless network such as Wi-Fi (802.11xx) based protocols, wireless wide area network such as Code Division Multiple Access (CDMA)—Evolution Data Only/Optimized (EVDO), Global System for Mobile-Communications (GSM)—High Speed Packet Access (HSPA), WiMax, infrared, voice command, Bluetooth™, Long Term Evolution (LTE), and/or other similar applications. In yet another embodiment, the network with which communications are made may include the Internet or World Wide Web. Other networks may also be utilized for connecting each of the various devices, systems and/or servers.

It should be appreciated that embodiments may include voice, data, multimedia (video, gaming, Internet Protocol Television (IPTV), Simple Messaging Service (SMS)/Multimedia Messaging Service (MMS), and/or other communicable transmissions. These may include audio, video, and/or other various signals having data/information.

By performing the various features and functions as discussed above, the EA system may allow implementation of equal distribution/allocation of access resources among the incoming sessions/services over IP and/or MPLS networks based on pre-specified criteria, type of service (e.g., at least one of voice, messaging, video, multimedia, etc.), or other similar criteria. This may enable implementation of equal access for voice service (e.g., over IP and/or MPLS networks) and other multimedia services allowing users (or subscribers) to choose a provider using a variety of criteria, such network identifier, provider identifier, etc., and allowing both users and service providers the desired (and sometimes required) flexibility.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
   receiving, from equipment associated with a requestor, a request for equal access over a network to a service provider;
   presenting equal access criteria to be satisfied by the equipment associated with the requestor, wherein the equal access criteria are provided based on at least a virtual local area network (VLAN) tagging, virtual private LAN service (VPLS) tagging, filtering via an access control list (ACL), filtering via a security enforcement scheme (SES), and automatic action via user profile; and
   allowing, to the equipment associated with the requestor, equal access over the network to the service provider in the event that the equal access criteria are satisfied by the requestor.

2. The method of claim 1, wherein the equal access criteria are applied to one or more routers, servers, switches, or intelligent devices or gateways.

3. The method of claim 1, wherein equal access is provided over a packet-switched network from the equipment of the requestor to the service provider, wherein the packet-switched network is an Internet Protocol (IP) network or a Multi Protocol Label Switching (MPLS) network.

4. The method of claim 1, wherein equal access is provided for at least one of voice, data, and multimedia communications.

5. The method of claim 1, wherein the service provider is at least one of a default service provider and a service provider selected by the requestor.

6. The method of claim 1, wherein a one-time or non-fixed service provider is selected by the requestor.

7. The method of claim 1, wherein the service provider is selected by the requestor based on at least one of a manual mode and a profile mode, wherein the manual mode offers selection from a list of service providers and wherein the profile mode offers selection based on predetermined conditions.

8. The method of claim 7, wherein the predetermined conditions comprise at least one of a user preference, date, time, event, quality of service, availability, and cost.

9. A non-transitory computer readable medium comprising code which when executed by a computer performs the method of claim 1.

10. A system, comprising:

a receiver to receive, from a requestor, a request for equal access to a service provider; and a processor to present equal access criteria to be satisfied by the requestor, and in the event the equal access criteria are satisfied by the requestor, to allow, to the requestor, equal access over a network to the service provider;

wherein the equal access criteria are provided based on at least a virtual local area network (VLAN) tagging, virtual private LAN service (VPLS) tagging, filtering via an access control list (ACL), filtering via a security enforcement scheme (SES), and automatic action via user profile.

11. The system of claim 10, wherein the equal access criteria are applied to one or more routers, servers, switches, or intelligent devices or gateways.

12. The system of claim 10, wherein the network is an Internet Protocol (IP) or a Multi Protocol Label Switching (MPLS) network.

13. The system of claim 10, wherein equal access is provided for at least one of voice, data, and multimedia communications.

14. The system of claim 10, wherein the service provider is a default service provider or a service provider is selected by the requestor.

15. The system of claim 10, wherein a one-time or non-fixed service provider selected by the requestor.

16. The system of claim 10, wherein the service provider is selected by the requestor based on at least one of a manual mode and a profile mode, wherein the manual mode offers selection from a list of service providers and wherein the profile mode offers selection based on predetermined conditions.

17. The system of claim 16, wherein the predetermined conditions comprise at least one of a user preference, date, time, event, quality of service, availability, and cost.

18. The system of claim 10, wherein the system is situated in at least one of a customer premises equipment (CPE), an access network (AN), a core network (CN), and a third party equal access server.

* * * * *